United States Patent [19]

Roggero et al.

[11] Patent Number: 4,853,440

[45] Date of Patent: Aug. 1, 1989

[54] POLYMERIC STABILIZER COMPOUNDS AND PROCESS FOR THEIR PREPARATION

[75] Inventors: Arnaldo Roggero, San Donato Milanese; Guglielmo Bertolini, Pavia, both of Italy

[73] Assignees: Eniricerche, S.p.A., Milan; Enichem Sintesi, S.p.A., Palermo, both of Italy

[21] Appl. No.: 57,092

[22] Filed: Jun. 2, 1987

[30] Foreign Application Priority Data

Jun. 5, 1986 [IT] Italy ................................ 20683 A/86

[51] Int. Cl.$^4$ ............................................. C08F 8/04
[52] U.S. Cl. ................................ 525/338; 525/332.8; 525/332.9; 525/333.1; 525/333.2; 525/339; 525/375
[58] Field of Search ............... 525/332.8, 332.9, 333.1, 525/333.2, 338, 339

[56] References Cited

U.S. PATENT DOCUMENTS

| | | | |
|---|---|---|---|
| 4,314,933 | 2/1982 | Berner | 525/279 |
| 4,356,287 | 10/1982 | Loffelman et al. | 524/99 |
| 4,369,274 | 1/1983 | Thomas | 524/99 |
| 4,370,430 | 1/1983 | Hoffman | 524/99 |
| 4,402,843 | 9/1983 | Trepka | 525/366 |
| 4,520,171 | 5/1985 | Dixely et al. | 525/375 |
| 4,594,395 | 6/1986 | Bezoari | 525/366 |
| 4,596,859 | 6/1986 | Bezoari | 525/366 |
| 4,797,451 | 1/1989 | Roggero et al. | 525/332.9 |

*Primary Examiner*—Joseph L. Schofer
*Assistant Examiner*—Bernard Lipman
*Attorney, Agent, or Firm*—Hedman, Gibson, Costigan & Hoare

[57] ABSTRACT

Polymeric stabilizer compounds are formed by an organic polymeric matrix, of paraffinic character, deriving from a hydrogenated polydiene and bearing bonded at at least one chain end a sterically hindered aminic function.

Such polymeric stabilizer compounds are obtained by means of a process, which provides:

(a) the polymerization of a diene, by the technique of the living polymers, under the influence of alkyl metal-alkyl or alkyl metal-aryl catalysts, to yield a polydiene bearing on its chain end a terminal metal atom;

(b) the reaction of said metal-bearing polydiene with a sterically hindered aminic compound, bearing in its molecule an electrophilic group, in particular a carbonyl group, reactive towards said metal of the metal-bearing polydiene;

(c) the catalytic hydrogenation of the polydiene bearing said sterically hindered aminic function at its chain end.

The so-obtained compounds are particularly useful in the stabilization of polypropylene towards the U.V. light degrading action.

8 Claims, 3 Drawing Sheets

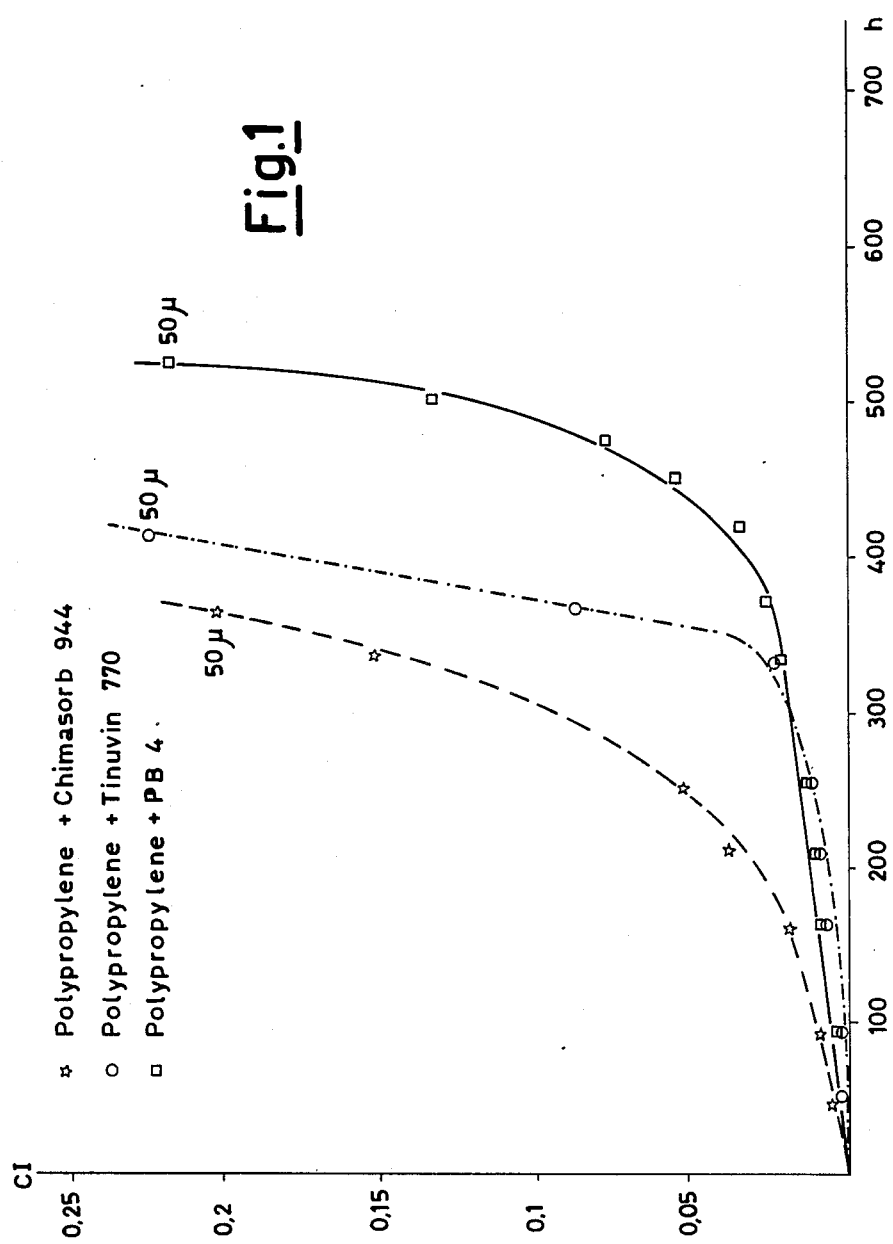

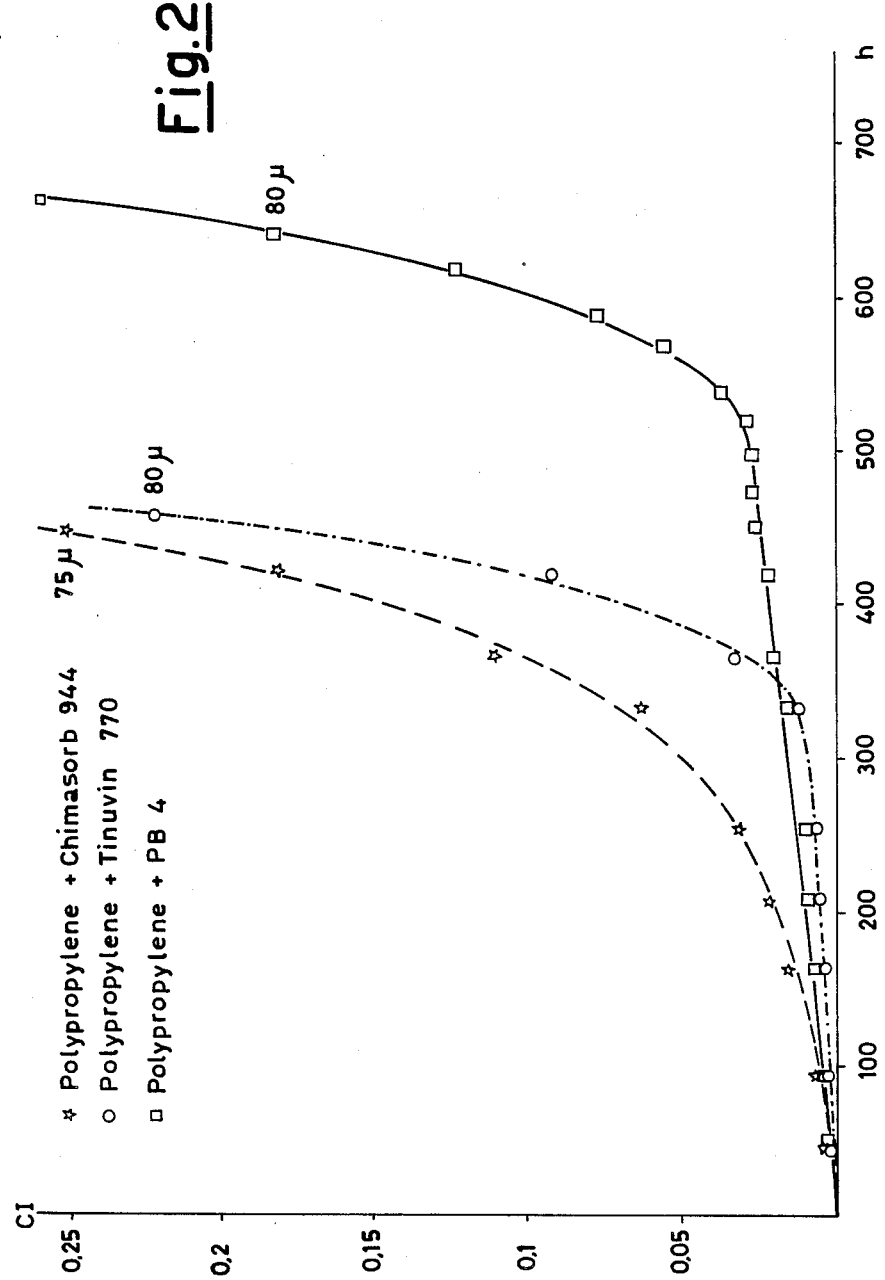

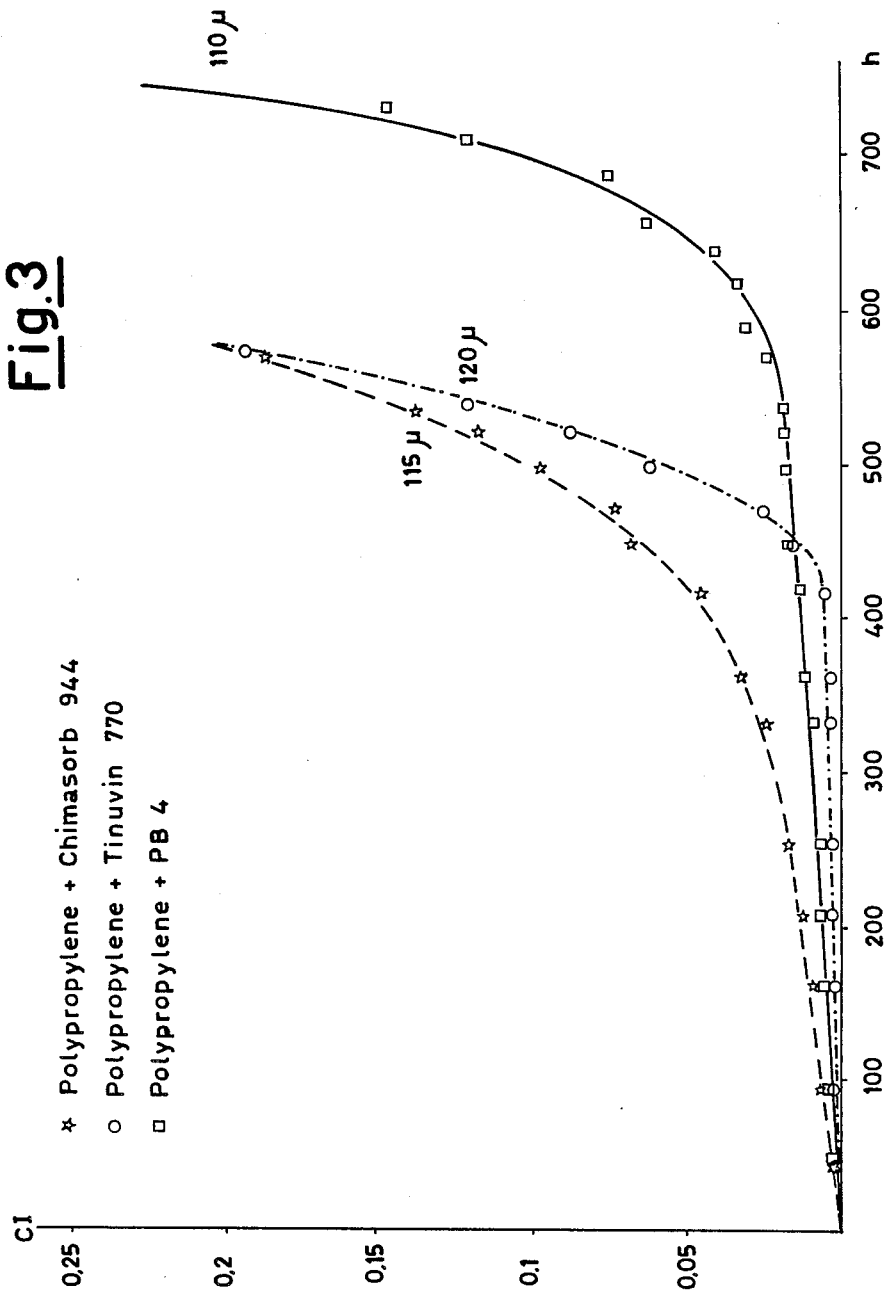

POLYMERIC STABILIZER COMPOUNDS AND PROCESS FOR THEIR PREPARATION

The present invention relates to polymeric stabilizer compounds for the organic polymers, in particular polypropylene, and to the process for preparing them.

The organic polymers are known to undergo degradation over time, due to the effect of the exposure to the atmospheric agent, and in particular to U.V. light.

For the purpose of counteracting such degradation, it is usual in the art to introduce into the organic polymers small amounts of stabilizer compounds, generally constituted by sterically hindered amines, such as, e.g., pyrrolidine derivatives (U.S. Pat. No. 4,325,864 and No. 4,346,188).

Furthermore known for that purpose are (U.S. Pat. No. 4,684,726 filed on May 13, 1985)

Stabilizer compounds containing in the same molecule a sterically hindered amino-group and a hydrolysable silicic function. These stabilizer compounds hydrolyse in correspondence of the silicic function, or they are reacted with a solid inorganic support containing surface hydroxy groups, or with an organic polymer bearing ethylenic unsaturations, in any case giving rise to complex structures which last, in the organic polymer into which they are incorporated, more stably than the usually sterically hindered amines.

In the U.S. Pat. No. 4,797,451 filed on Sept. 24, 1986 in the same Applicant's name, disclosed are polymeric stabilizer structures formed by an organic polymeric matrix to which groups are linked, which contain a sterically hindered aminic function. These structures are endowed with characteristics of compatibility with the organic polymers which are the higher, the more similar the nature of their polymeric matrix to the organic polymer undergoing the stabilization.

A particular class of stabilizers of the U.S. Pat. No. 4,797,451 is formed by a polydienic matrix bearing a sterically hindered aminic function at its chain end.

It has been found now that when the polydienic chain of said stabilizers is hydrogenated, so to remove the unsaturations to a complete, or substantially complete, extent, polymeric stabilizer compounds are obtained which are endowed with surpriseingly improved characteristics not only as relates to their compatibility with polypropylene, or with other olefinic polymers, but also as relates to the characteristics of stability they give to said polymers.

Accordingly, the present invention relates to polymeric stabilizer compounds formed by an organic polymeric matrix, of paraffinic character, deriving from a hydrogenated polydiene and bearing, bound to at least one chain end, a sterically hindered aminic function, said polymeric matrix having a molecular weight, or average molecular weight, of from about 200 to about 100,000, said sterically hindered aminic function supplying an amount of active nitrogen equal to at least 0.7% by weight, relatively to the weight of the same stabilizer.

In the preferred form of practical embodiment, the polymeric matrix has a molecular weight of from about 1,000 to about 20,000, and the sterically hindered aminic function supplies an amount of active nitrogen of from 0.14 to 4.3% by weight.

The polymeric stabilizer compounds of the present invention can be prepared by means of a process comprising the following steps, carried out successively:

(a) the polymerization of a diene, by the technique of the living polymers, under the influence of alkali metal-alkyl or alkali metal-aryl catalysts, to yield a polydiene bearing a metal atom on its chain end;

(b) the reaction of said metal-bearing polydiene with a sterically hindered aminic compound, bearing in its molecule an electrophilic group, in particular a carbonyl group, reactive towards said metal of the metal-bearing polydiene;

(c) the catalytic hydrogenation of said polydiene bearing said sterically hindered aminic function at its chain end.

In the (a) step of the process of the present invention a dienic monomer, generally selected from 1,3-butadiene, isoprene, piperylene, and 2,3-dimethyl-1,3-butadiene is submitted to polymerization under the influence of an alkali metal-alkyl or alkali metal-aryl, by operating in a solvent selected from those normally used for the anionic polymerization.

The most useful catalysts for the intended purpose are lithium-n-butyl, lithium-sec-butyl, sodium-amyl, sodium-naphthalene and dilithium-distyryl-naphthalene, which are used in an amount depending on the desired molecular weight for the polydiene, according to the known relationship for the living polymerizations.

Together with the polymerization catalyst, an activator of the same polymerization can be used, possibly having the additional function of modifying the structure of the polydiene. Activators suitable for that purpose are triethylamine, anisole, tetrahydrofuran, dioxane and N,N,N,',N'-tetramethylenediamine, which are usually employed in an amount of from 10 to 100 mol per each 100 mol of alkali metal-alkyl or alkali metal-aryl catalyst. The solvents useful for the polymerization of the diene can be selected from the aliphatic, cycloaliphatic or aromatic solvents, such as e.g., heptane, cyclohexane, methyl-cyclohexane, benzene and toluene, or from the polar solvents, such as tetrahydrofuran or dioxane, under such conditions as to prevent any interactions with the catalyst.

The polymerization of the diene is carried out by operating by the solution technique in the selected solvent, at a temperature which can generally range from −80° C. to 150° C., and preferably from −20° to 80° C., until a polydiene bearing terminal metal atoms at its chain ends is obtained, which has a molecular weight of from about 200 to about 100,000, preferably of from about 1,000 to about 20,000.

This metal-bearing polydiene is reacted, in the (b) step of the process of the present invention, with a sterically hindered aminic compound bearing in its molecule an electrophilic group, in particular a carbonylic group, reactive with the metal of said metal-bearing polydiene.

The sterically hindered aminic compounds, useful for the purposes of the present invention, contain in their molecule the group: of 2,2,6,6-tetramethylpiperidine:

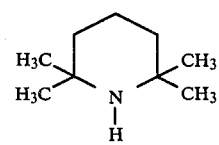

of 2,2,6,6-tetramethylmorpholine:

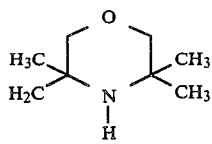

of 2,2,5,5-tetramethylpyrrolidine:

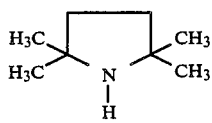

of 2,2,3,5,5-pentamethylpyrrolidine:

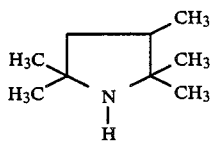

of 2,2,5,5-tetramethylimidazoline:

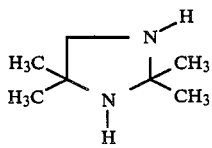

of 1,3,3,5,5-pentamethylpiperazine:

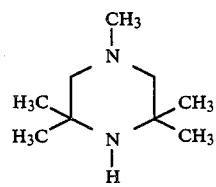

of 1,3,3-trimethyldecahydroquinoxaline:

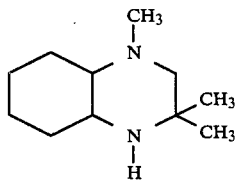

or however of any other compounds bearing the sterically hindered amino-group:

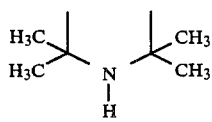

or of the related derivatives substituted on the nitrogen atom with an alkyl of from 1 to 18 carbon atoms.

Besides the above-indicatated amino group, the compounds useful for the purposes of the present invention contain also a functional electrophilic group, necessary for the reaction with the metal-bearing polydiene. For that purpose, different functional electrophilic groups can be used, with the carbonyl group being preferred.

A particularly useful compound is 2,2,6,6-tetramethyl-4-piperidone:

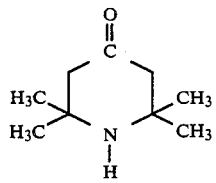

easily obtainable by means of the reaction of acetone with ammonia.

Other useful compounds are:
3,3,5,5tetramethylmorpholin-2-one;
1,3,3,5,5-pentamethyl-piperazin-2-one;
2,2,5,5-tetramethylimidazolin-4-one;
1,3,3-trimethyl-decahydroquinoxalin-2-one.

In the (b) step of the process of the present invention, the metal-bearing polydiene, in the related solution outcoming from the polymerization step, is contacted with the sterically hindered aminic compound, additionally containing an electrophilic compound, and the reaction is carried out, with a stoichiometric, or approximately stoichiometric ratio, between said aminic compound and the carbanionic centres of the metal-bearing polydiene, at a temperature comprised within the range of from 0° to 150° C., and for a time of from 30 minutes to 6 hours, in order to obtain a polydiene containing the sterically hindered aminic function linked to at least one end of the macromolecule.

In the (c) step of the process of the present invention, the polydiene containing the aminic function is submitted to a catalytic hydrogenation for saturating the unsaturations present in the polydienic chain.

Catalysts useful for that purpose are the noble-metal catalysts, and, among these, the palladium catalysts, in particular in the form supported on coal.

Typically, a catalyst of 10%-palladium on coal is added to the solution of the compound to be hydrogenated in the related solvent coming from the proceding (b) step, and the reaction is carried out at a temperature of from 20° to 200° C., under a hydrogen pressure of from 1 to 20 atm., until the complete or substantially complete disappearance of the unsaturations of the polydienic chain.

Also useful for the intended purposes are soluble hydrogenation catalysts, e.g., the catalysts based on lithium-alkyls and cobalt-ethylhexanoate, aluminum hydrides and cobalt octanoate, aluminum-alkyls and nickel naphthenate. In case of lithium, typically a lithium/cobalt ratio equal to 2.2 is adopted, and the reaction is furthermore carried out with a ratio of cobalt to the double bonds to be hydrogenated equal to 0.009, at a temperature of approximately 50° C., under 3 atmospheres of hydrogen, for about one hour.

In this way, the polymeric stabilizer compound of the present invention is obtained, which can be separated from the reaction mixture, generally as a waxy solid, by precipitation by the addition of a non-solvent, such as an alcohol, e.g., methanol, with a subsequent filtration or centrifuation, the possible washing and the drying thereof.

In the preferred form of practical embodiment of the process of the present invention, butadiene is polymerized to yield a metal-bearing polybutadiene, which is interreacted with 2,2,6,6-tetramethyl-4-piperidone to yield a polybutadiene bearing the sterically hindered aminic function at its chain end. After the catalytic hydrogenation, the polymeric stabilizer according to the present invention is obtained, generally as a waxy solid, schematically definable by the formula:

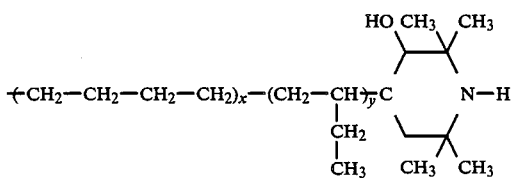

which can coexist with the form:

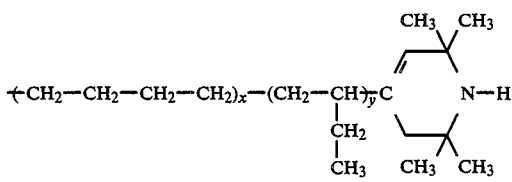

and/or withthe hydrogenated form:

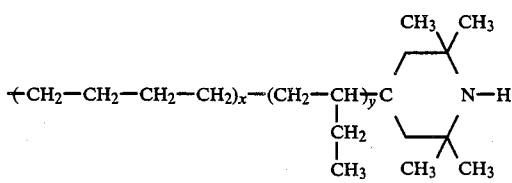

wherein x and y represent the hydrogenated butadienic units respectively deriving from the 1,4- and 1,2-structures, such units being randomly distributed along the polymeric chain, it being furthermore possible to bind the piperidinic function to the 1,4-butadienic function rather than to the 1,2-butadienic function, as shown in the above formulae.

In the preferred form of embodiment, in the polybutadienic matrix a ratio of the x units to the y units within the range of from 92-80% to 8-20% is maintained.

However, useful results are obtained also outside the above indicated ratio.

The polymeric stabilizer compounds of the present invention can be easily homogenized with the organic polymers, and show unexpectedly high endowments of compatibility, and stabilizing characteristics for polypropylene and other olefinic polymers, said stabilizer compounds can anyway be advantageously used for stabilizing organic polymers different from polyolefins.

Hence, according to a further aspect thereof, the present invention relates to compositions stable to the degrading action of the U.V. light, which comprise an organic polymer, preferably a polyolefin and in particular polypropylene and an amount of a polymeric stabilizer compound of the present invention, which ensures the presence in the composition of an amount of active nitrogen of from 0.005 to 0.02% by weight and preferably of the order of 0.015% by weight.

By "active nitrogen", the nitrogen is meant which is supplied by the sterically hindered aminic group.

The stabilized polymeric compositions of the present invention can be prepared by means of any techniques known and used for homogenizing an organic polymer with the stabilizer agent.

According to a form of practical embodiment, a simple mixing is carried out of the solid organic polymer powder and the solid waxy polymeric stabilizer.

The following examples are illustrative and not limitative of the invention.

EXAMPLE 1

To a glass reactor of 1 litre of capacity, equipped with mechanical stirrer, temperature and pressure measuring instruments and means for the introduction of the reactants and of a stream of inert gas, 360 ml of cyclohexane, 27 g of butadiene and 25 mmol of of lithiumsec.butyl are charged, and the polymerization is carried out under a nitrogen stream at 80° C. for two hours. At the end of this time period, the temperature is decreased to room values (20°-25° C.) and approximately 20 mmol is introduced of 2,2,6,6-tetramethyl-4-piperidone. The reaction mass is kept stirred at room temperature for 2 hours and about 1 ml is added of methanol for the purpose of discontinuing the reaction.

To the layer of separated cyclohexane, 1.5 g is added of catalyst of 10%-palladium on coal, and hydrogen is fed up to 12 atm., measured at room temperature.

The reaction mixture is then heated to 80° C., with hydrogen being fed when the pressure tends to decrease, until no further appreciable absorption of hydrogen is observed any longer. The temperature is finally increased to 150° C., and is kept at such value for approximately 2 hours; the reaction mixture is finally cooled.

From the reaction mixture, the polymeric stabilizer is recovered, by separating first the hydrogenation catalyst by filtration, and then the solvent by evaporation.

Thus, about 28 g is recovered of a waxy solid, which, at the elemental analysis, shows a nitrogen content of about 0.5% by weight.

The $^1$H-N.M.R. analysis evidences a signal at 1,1, to be attributed to the methyls of 2,2,6,6-tetramethyl-4-piperidone and furthermore confirms the total hydrogenation of the product.

The molecular weight of this product, determined by osmometry, results to be equal to about 1,500 g/mol, hence in good agreement with that which can be deducted on the basis of the content of piperidinic groups (nitrogen analysis), assuming one piperidinic group per each polybutadiene molecule.

EXAMPLE 2

The process is carried out as disclosed in Example 1, with the only difference that, instead of butadiene, isoprene is fed. A product is obtained which, after the hydrogenation, is similar to an ethylene-propylene copolymer to which the hindered piperidinic function is linked.

Its molecular weight is about 1,400 g/mol, and its nitrogen content is of about 1% by weight.

EXAMPLE 3

The process is carried out as disclosed in Example 1, with the only difference that 12-13 mmol of lithiumsec.-butyl is fed. A product is isolated which, as compared to that of Example 1, shows a molecular weight of about 3,000 g/mol.

EXAMPLE 4

The reactor disclosed in Example 1 is charged with 200 ml of anhydrous tetrahydrofuran containing 10 mmol of sodium-naphthalene and, by operating at room temperature, about 2 g of butadiene, and 10 minutes later, a further 7 grams of butadiene are charged portionwise, and the reaction is allowed to proceed for about one hour.

At the end of this time period, 2 mmol is charged of 2,2,6,6-tetramethyl-4-piperidone and, after 30 minutes of reaction, the reaction is quenched with 5 ml of methanol. Tetrahydrofuran is evaporated off, the residue is collected with cyclohexane and the hydrogenation is carried out by adding 0.5 g of catalyst of 10%-palladium on coal, and operating in a way similar to that as disclosed in Example 1.

At hydrogenation end, a solid stabilizer is recovered which, at the elemental analysis, shows a content of 1.3% by weight of nitrogen.

EXAMPLE 5-8

The process is carried out as in Example 1, with equivalent amounts of
Example 5: 3,3,5,5-tetramethyl-morpholin-2-one:
Example 6: 1,3,3,5,5-pentamethyl-piperazin-2-one;
Example 7: 2,2,5,5-tetramethyl-imidazolin-4-one;
Example 8: 1,3,3-trimethyl-decahydro-quinoxalin-2-one
being respectively used instead of the piperidone of said Example 1.

EXAMPLE 9

(a) The solid polymeric stabilizer obtained in Example 1 (PB4) is submitted to thermogravimetric analysis, under an inert gas atmosphere, and with programmed temperature (10° C./minute). In the following Table I, the percent values are reported of the weight loss, over different temperature ranges, of the stabilizer of Example 1 (PB4), as compared to the values relating to the commercial stabilizers known under the trademarks: TINUVIN 770 and CHIMASSORB 944.

TINUVIN 770 is a CIBA-GEIGY commercial product, and is constituted by bis(2,2,6,6-tetramethyl-4-piperidinyl) sebacate.

CHIMASSORB 944 is a CIBA-GEIGY commercial product and is constituted by a sterically hindered amine, of polymeric type.

TABLE 1

| STABILIZER | WEIGHT LOSS (%) | | |
|---|---|---|---|
| | ΔT 35–230° C. | ΔT 230–280° C. | ΔT 395° C. |
| PB4 | 0.1 | 0.3 | 8.5 |
| TINUVIN 770 | 1.3 | 20.1 | 100.0 |
| CHIMASSORB 944 | 0.3 | 0.3 | 14.5 |

The stabilizer results hence stable also at high temperatures, and this characteristic makes it particularly useful as a long-term stabilizer in polymeric compositions, by not giving practically rise to phenomena of degradation or of transformation inside the temperature range inside which the polymeric compositions are usually processed during their transformation step.

Similar characteristics of stability are observed for the solid polymeric stabilizers of the other experimental examples.

(b) The stabilizing activity of PB4 is verified on the basis of its capability of inhibiting the degradation of polypropylene submitted to the influence of U.V. light.

The incorporation of the stabilizer into polypropylene is accomplished by making this latter swell in benzene containing the additive, and then evaporating the mass under vacuum to dryness.

In particular, to the commercial polypropylene FLF20 by MONTEDISON the stabilizer PB4 is added in such an amount as to have a content of active nitrogen in the resulting composition of 0.015% by weight.

The resulting composition is moulded at 180° C., under a pressure of 100 kg/cm$^2$, for a time of 1.5 minutes, a film of 110 μm of thickness being obtained.

The film extracted from the press is rapidly cooled under tap water, and is submitted to accelerated ageing in a special UVCON equipment by ATLAS, with alternated cycles of irradiation with fluorescent lamps, rich of UV radiations, at a wavelength comprised within the range of from 280 to 350 nm, and of condensation in the dark, at controlled temperatures.

More particularly, in the investigated case, a cycle is imposed of 8 hours of irradiation at 60° C., and of 4 hours of condensation at 40° C.

The degradation of polypropylene is verified on the basis of the formation of carbonylic compounds (CO index), as evidenced by I.R. spectrum. In particular, the CO index is measured as a function of the increase in absorption at 1,710 cm$^{-1}$. In the instant test, the increase in absorption at 1,710 cm$^{-1}$ over a time period of 750 hours is measure for:

(1) a polypropylene film containing the stabilizer PB4 (indicated with (□) in the Figures);

(2) a polypropylene film obtained as in the preceding case, and containing the commercial stabilizer TINUVIN 770 in such an amount as to have a content of active nitrogen equal to 0.015% by weight (indicated with ◯) in the Figures);

(3) a polypropylene film obtained as in the preceding case, and containing the commercial stabilizer CHIMASSORB 944 in such an amount as to have a content of active nitrogen equal to 0.015% by weight (indicated with ( ) in the Figures).

The data obtained is shown in FIG. 1, relating to the 50 μm-thick films, which clearly evidences the greater stabilizing efficacy of PB4 as compared to the other two commercial stabilizers.

In FIGS. 2 and 3, the same data of carbonyl index (CI) is reported for the three film samples having a thickness of respectively 80 μm and 115 μm. The trend is clearly favourable to the stabilizer of the present invention.

A similar behaviour was recorded with the polymeric stabilizers as reported in the other Examples.

(c) The compatibility of stabilizer PB4 with polypropylene, and its useful life in the same polymer under high thermal stress conditions, are detected by measuring the steady-state concentration of nitroxyl radical, obtained by means of the oxidation of the sterically hindered amino-group in the stabilizer molecule, obtained by means of ESR spectra directly performed on samples of polymer containing the stabilizer and maintained some hours at 170° C. In particular, the formation of the nitroxyl radical is directly induced in the polypropylene film by photosensitized oxidation with singlet oxygen.

The polypropylene film is obtained as previously disclosed.

The amount of stabilizer PB4 is equal to 2.5% by weight, corresponding to 0.015% by weight of active nitrogen.

The photosensitizer (Rose, Bengal, chlorophyll) is added in the amount of 0.1% by weight relatively to the polymer. The film is then submitted to a U.V. irradiation for 18 hours, with a 150 W high-pressure mercury-vapour lamp, coupled to a UV 31 filter, which ensures a radiation passband at 290 nm. After the irradiation of a weighted film portion, the verification is carried out, by means of ESR spectra, of the formation of the radical and of its persistence in the sample at the temperature of 170° C.

The film to which PB4 was added resulted stable for 5 hours at 170° C., as the films to which Tinuvin 770 and Chimassorb 944 were added.

A similar behaviour was observed by using the solid polymeric stabilizers of Examples 2 through 7;

(d) the polypropylene films containing the stabilizer PB4, obtained as previously disclosed, are finally submitted to extraction tests, carried out at 60° C. and for 24 hours, with aqueous solutions at 2% by weight of alkaline detergents. Practically no phenomena of extraction of the stabilizer from the film were observed.

We claim:

1. Process for the preparation of polymeric stabilizer compounds formed by an organic polymeric matrix characterized in that it comprises the following steps in succession:

(a) polymerizing a diene, under the influence of an alkali metal-alkyl or alkali metal-aryl catalyst, to yield a polydience bearing on its chain end a terminal metal atom;

(b) reacting said metal-terminated polydiene with a sterically hindered aminic compound, said compound comprising units of the formula

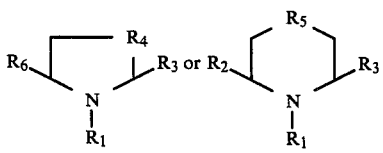

wherein $R_1$ is hydrogen, $R_2$ is dimethyl or aryl, $R_3$ and $R_6$ are dimethyl, $R_4$ is carbon or nitrogen and $R_5$ is oxygen, carbon, or nitrogen; or related derivatives substituted on the hindered nitrogen atom with an alkyl group of from 1 to 18 carbon atoms bearing in its molecule an electrophilic group reactive towards said metal of the metal-terminated polydiene;

(c) catalylically hydrogenating said polydiene bearing said sterically hindered aminic function at its chain end, for the purpose of eliminating, at least to a substantially complete extent, the unsaturation of the polydiene chain.

2. Process according to claim 1, wherein in the (a) step butadiene or isoprene is polymerized with lithium-n-butyl, lithium-sec-butyl, sodium-amyl, dilithiumdistyryl-naphthalene and sodium-naphthalene as catalyst, by operating in an organic solvent selected from the aliphatic solvents, cycloaliphatic solvents or aromatic solvents, or in polar solvents at a temperature comprised within the range of from −80° to 150° C., and preferably of from −20° to 80° C., until a metal-bearing polybutadiene or polyisoprene is obtained, with a molecular weight of from approximately 200 to approximately 100,000.

3. Process according to claim 2, wherein the polymerization is carried out in the presence of an activator selected from triethylamine, anisole, tetrahydrofuran, dioxane and N,N,N,',N'-tetramethylenediamine, in an amount of from 10 to 100 mol per each 100 mol of catalyst.

4. Process according to claim 2, wherein the solvent is selected from heptane, cyclohexane, methylcyclohexane, benzene, toluene, tetrahydrofuran and dioxane.

5. Process according to claim 1, wherein the sterically hindered aminic compound bearing an electrophilic group is selected from 2,2,6,6-tetramethyl-4-piperidone; 3,3,5,5tetramethylmorpholin-2-one; 1,2,2,5,5-pentamethyl-piperazin-2-one; 2,2,5,5-tetramethylimidazolin-4-one; and 1,3,3-trimethyl-decahydroquinoxalin-2-one, and the reaction is carried out with a stoichiometric, or nearly stoichiometric, ratio of said sterically hindered aminic compound to the carbanionic centres of the metal-bearing polydiene, in an organic solvent, at a temperature comprised within the range of from 0° to 150° C. and for a time of from 30 minutes to 6 hours.

6. Process according to claim 1, wherein in the (c) step a catalyst of noble metal is used, at a temperature of from 20 to 200° C., and under a hydrogen pressure of from 1 to 20 atm.

7. Process according to claim 6, wherein the catalyst is a catalyst of palladium supported on coal.

8. Process of claim 5, wherein a metal-bearing polybutadiene or polyisoprene is obtained, with a molecular weight of from approximately 1,000 to approximately 20,000.

* * * * *